March 6, 1962  A. J. PALFEY  3,023,456
EXTRUDER APPARATUS
Filed Aug. 3, 1959
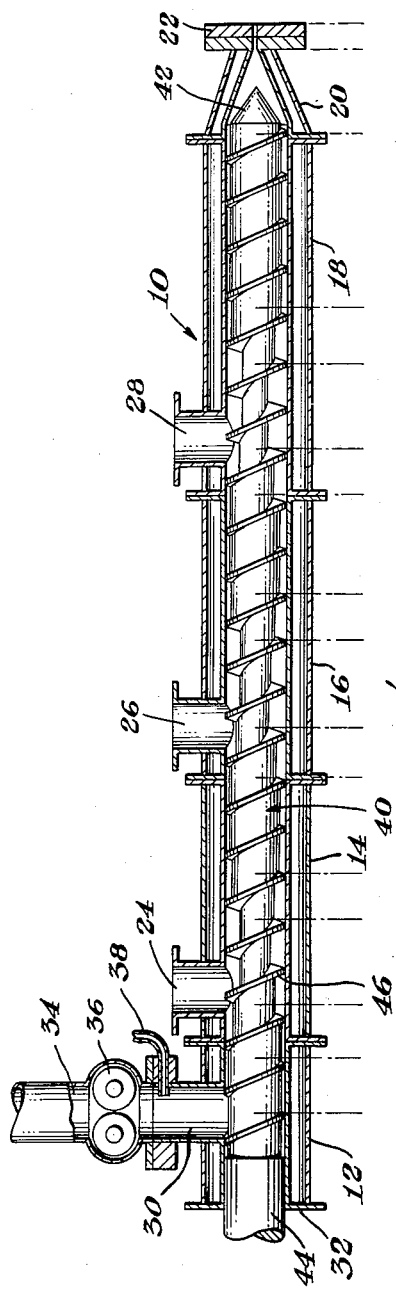
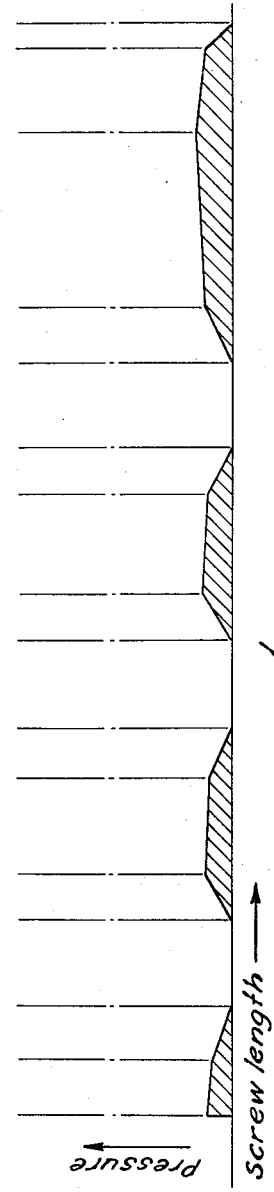
INVENTOR.
Albert J. Palfey
BY Earl D. Ayers
AGENT United States Patent Office 3,023,456
Patented Mar. 6, 1962

3,023,456
EXTRUDER APPARATUS
Albert J. Palfey, Midland, Mich., assignor to The Dow Chemical Company, Midland, Mich., a corporation of Delaware
Filed Aug. 3, 1959, Ser. No. 831,121
3 Claims. (Cl. 18—12)

This invention relates to improved extruder apparatus and particularly to improved molten feed screw extruder devices.

It is desirable in the art of extruding plastic materials in a molten feed type machine that the machine simultaneously continuously advance, devolatilize, mix, and extrude material.

Conventional plastics mixer-extruder devices are designed with various types of mixing torpedoes, mixing heads, baffles or other devices in conjunction with and preceding a conventional extruder screw. Such devices require high pressures to be applied by the screw on the plastics to advance the material through the mixing devices. High pressures mean high power input to the screw and such pressures can, also, possibly cause degradation of the plastic. In addition, such machines, although producing a well mixed product, produce it at a lower output rate than is desirable.

A principal object of this invention is to provide improved extruder apparatus which is capable of producing well mixed plastic material at high output and with low energy input to the apparatus.

Another object of this invention is to provide an improved screw for use in extruding plastics.

A further object of this invention is to provide an improved extruder which does not generate excessive pressures during materials mixing and extruding operations.

Yet another object of this invention is to provide a screw extruder which has improved feed mixing characteristics.

In accordance with this invention there is provided a so-called molten feed extruder having a plurality of spaced apart devolatilizing vents along its cylinder, and a screw having sections of sequentially varying root diameter disposed within the cylinder. The root diameter of the screw is a maximum at the input end, between each devolatilizing vent and at the output end, and is a minimum at each devolatilizing vent, the screw having a substantially constant pitch.

The invention, as well as additional objects and advantages thereof, will best be understood when the following detailed description is read in connection with the accompanying drawing, in which:

FIG. 1 is a side elevational view, partly in section, of extruder apparatus in accordance with this invention, and FIG. 2 is a graph showing the relative pressure developed at various points along the extruder screw.

Referring to FIG. 1 of the drawing, there is shown a screw extruder, indicated generally by the number 10, having, for example, a plurality of cylinder sections 12, 14, 16, 18 (although a single section cylinder might be used) and a nose or output section 20 to which is coupled a die 22. Devolatilizing vents 24, 26 and 28 are disposed at the junction between each of the four cylinder sections 12, 14, 16 and 18. The vents 24, 26, 28 may, if desired (although not so illustrated), be sealed.

A feed inlet 30 for the materials to be extruded is provided near the drive end 32 of the apparatus. A feed line 34 in which a force drive pump 36 is incorporated in and an auxiliary feed line 38 are coupled to the feed inlet 30. A screw, indicated generally by the number 40, extends through the cylinder sections and terminates with its forward end 42 in the nose section 20. The shank end 44 of the screw 40 extends outwardly from the drive end 32 and may be rotated by any suitable driving means (not shown). The screw has a helical thread 46 which is of generally constant pitch, the pitch being between a minimum angle of 9 degrees and a maximum angle of 18 degrees.

The root diameter of the screw 40 varies in a cyclic manner along its length, being a maximum at the feed inlet section, near the output end and between each pair of vents 24, 26 or 28. The root diameter is a minimum at each devolatilizing vent, increasing to maximum diameter on each side of the vents.

In one extruder screw made in accordance with this invention the threaded and nose part of the screw is 29 inches long, the maximum diameter of the screw is 1½ inches, the maximum root diameter is 1¼ inches, the minimum root diameter is 1 inch, and there are 22 turns of thread along the screw.

The root diameter varies along the screw from the input end to the nose or output end as follows: first 4 turns are of maximum root diameter, 5th turn varying from maximum to minimum root diameter in a spiral manner, 6th and 7th turns are of minimum root diameter, 8th turn varying from minimum to maximum root diameter in a spiral manner, 9th and 10th turns are of maximum root diameter, 11th turn varying from maximum to minimum root diameter in a spiral manner, 12th and 13th turns are of minimum root diameter, 14th turn varying minimum to maximum root diameter in a spiral manner, 15th and 16th turns are of maximum root diameter, 17th turn varying maximum to minimum root diameter, in a spiral manner, 18th and 19th turns are of minimum root diameter, 20th turn varying minimum to maximum root diameter in a spiral manner, and the last two turns are of maximum root diameter.

In operation molten polymer is force fed by the gear pump 36 or other suitable means through the feed port 30, for example, at a pressure high enough to fill the flight of the screw 40 at a section of maximum root diameter, thus, metering the flow of plastic into the extrusion apparatus.

Referring to FIG. 2 as well as to FIG. 1, the feed material is fed into the apparatus at a pressure which is at least equal to the pressure required to extrude the material through the die 22. As the feed material advances toward the output end of the screw, the pressure reaches a minimum at the parts of the screw having a minimum root diameter and rises to a maximum at the parts of the screw having maximum root diameter. The feed material, including any material (such as coloring agents, for example) fed in through the auxiliary feed line 38, is thoroughly mixed as it passes along the screw because of changes in flow pattern in areas of differing pressure. The feed material appears to mix by folding over laterally on itself in the low pressure areas and to mix in a forward direction in the high pressure sections of the screw. Because of the slight pressure on the material at the parts of the screw having minimum root diameter, unwanted gases may be easily vented at the ports 24, 26, or 28 with which the low pressure parts of the screw 40 are aligned.

Because of feed material metering and because the pitch of the screw is constant (or almost so), the pressure buildup at parts of the screw which have maximum root diameter does not greatly exceed the pressure required to extrude the feed material. The result is that the feed material becomes thoroughly mixed as it passes along the screw. The instant device, however, requires less energy to achieve the mixing and to extrude the material than do conventional devices.

Another advantage of this extruder apparatus is its relatively low inventory of feed material and the ease with which the screw may be cleaned. When the color of the feed material must be changed frequently, the above features result in a reduced amount of off-color product due to a color changeover.

While the ports 24, 26, and 28 are adapted as vent ports, one or more of the ports may be used to insert additional feed or coloring material or, if the ports aren't needed for other purposes, they may be closed.

I claim:

1. Extruder apparatus comprising a hollow cylinder having a feed inlet for molten feed material adjacent to one end thereof and a die adjacent to the other end thereof, and a rotatable helically threaded screw disposed within the cylinder and extending from the feed inlet to near to the die, said screw having a substantially constant pitch and land diameter all along the flight of the screw, said screw having a plurality of contiguous flight sections of differing root diameter, there being at least three flight sections of large root diameter, at least two sections of small root diameter, and sections having continuously varying root diameter, one of said sections of varying root diameter being disposed between each of said sections of large and small root diameter, the root diameter of each such section matching at its ends the root diameters of the sections with which it is contiguous, one of said sections of large root diameter being contiguous to the die end of said screw and another of said sections of large root diameter being disposed contiguous to and across the feed inlet of the screw, the root diameter of the section contiguous to the feed inlet being at least as large as the root diameter of the root diameter of the section contiguous to the die end of the screw.

2. Apparatus in accordance with claim 1, wherein said sections of varying diameter each comprise only a single turn of said screw.

3. Apparatus in accordance with claim 1, wherein the pitch of the threaded part of said screw is between 9 and 18 degrees.

References Cited in the file of this patent

UNITED STATES PATENTS

| | | |
|---|---|---|
| 1,156,096 | Price | Oct. 12, 1915 |
| 2,719,325 | Franklin | Oct. 4, 1955 |
| 2,774,105 | Bernhardt | Dec. 18, 1956 |